United States Patent
Saito

(10) Patent No.: US 10,828,913 B2
(45) Date of Patent: Nov. 10, 2020

(54) PRINTING APPARATUS, PRINTING METHOD, AND PRINTING MANAGEMENT APPARATUS

(71) Applicant: SEIKO EPSON CORPORATION, Tokyo (JP)

(72) Inventor: Masanori Saito, Sapporo (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 16/114,549

(22) Filed: Aug. 28, 2018

(65) Prior Publication Data
US 2019/0061379 A1 Feb. 28, 2019

(30) Foreign Application Priority Data
Aug. 30, 2017 (JP) ................. 2017-165182

(51) Int. Cl.
| | |
|---|---|
| *B41J 11/00* | (2006.01) |
| *B41J 13/00* | (2006.01) |
| *B41J 2/175* | (2006.01) |
| *B41J 11/42* | (2006.01) |
| *B41J 2/475* | (2006.01) |

(Continued)

(52) U.S. Cl.
CPC ......... *B41J 11/002* (2013.01); *B41J 2/17556* (2013.01); *B41J 2/475* (2013.01); *B41J 11/42* (2013.01); *B41J 13/0018* (2013.01); *B41J 2/2056* (2013.01); *G06F 3/1258* (2013.01)

(58) Field of Classification Search
CPC ..... B41J 2/435; B41J 2/44; B41J 2/447; B41J 2/475; B41J 2/205; B41J 2/2052; B41J 2/2054; B41J 2/2056; B41J 2/21; B41J 2/2132; B41J 11/002
See application file for complete search history.

(56) References Cited

U.S. PATENT DOCUMENTS

| | | | |
|---|---|---|---|
| 2002/0012543 A1* | 1/2002 | Nakamura | G03G 15/2017 399/69 |
| 2008/0298821 A1* | 12/2008 | Mori | B41J 3/60 399/21 |
| 2016/0274524 A1* | 9/2016 | Miyajima | G03G 15/234 |

(Continued)

FOREIGN PATENT DOCUMENTS

| | | |
|---|---|---|
| JP | 2008-102201 A | 5/2008 |
| JP | 2008-102261 | 5/2008 |

(Continued)

*Primary Examiner* — Scott A Richmond
(74) *Attorney, Agent, or Firm* — Workman Nydegger

(57) ABSTRACT

A printing apparatus includes a print head, a processor, and a drying mechanism. The print head ejects ink onto a printing medium located in a printing region to form an image. The processor is configured to control a duty that is an amount of ink ejected by the print head onto the printing medium per unit area. The drying mechanism includes a transport unit that transports the printing medium in a first direction and a heater that heats the printing medium. The drying mechanism is configured to dry the printing medium having the image formed thereon by the print head, by transporting, using the transport unit, the printing medium to a drying region in which the printing medium is dried by the heater. The processor controls drying of the printing medium performed by the drying mechanism in accordance with the duty.

7 Claims, 4 Drawing Sheets

(51) Int. Cl.
*G06F 3/12* (2006.01)
*B41J 2/205* (2006.01)

(56) References Cited

U.S. PATENT DOCUMENTS

2018/0339527 A1* 11/2018 Tamai .................. B41J 11/0005
2019/0004468 A1* 1/2019 Watanabe .............. B41J 11/007

FOREIGN PATENT DOCUMENTS

| JP | 2018199544 A | * | 12/2018 | ............. B65H 23/34 |
| JP | 2019006071 A | * | 1/2019 | ............. B41J 11/002 |

* cited by examiner

FIG. 3

| DUTY | 200% | 150% | 100% | 50% |
|---|---|---|---|---|
| DRYING POWER | MAX | HIGH | STANDARD | LOW |
| NUMBER OF TIMES OF OVERPRINTING | 4 TIMES | 3 TIMES | 2 TIMES | OFF |

FIG. 4

| DRYING POWER | MAX | HIGH | STANDARD | LOW |
|---|---|---|---|---|
| HEATER TEMPERATURE | 55°C | 55°C | 50°C | 50°C |
| MAIN-SCANNING INTERVAL | 10 SECONDS | 5 SECONDS | 3 SECONDS | 0 SECONDS |
| FEED AMOUNT | L3 | L2 | L1 | OFF |
| DRYER FAN | ON | ON | ON | ON |
| CONTACT AVOIDANCE | ON | ON | OFF | OFF |

PRINTING APPARATUS, PRINTING METHOD, AND PRINTING MANAGEMENT APPARATUS

CROSS-REFERENCE TO RELATED APPLICATIONS

The present application claims priority to Japanese Patent Application No. 2017-165182, filed Aug. 30, 2017, which is hereby incorporated by reference in its entirety.

BACKGROUND

1. Technical Field

This invention relates to a sublimation printing technique for causing an image printed on a printing medium to sublimate onto a transfer-target substrate to transfer the image from the printing medium onto the transfer-target substrate and, more particularly, to a technique for performing printing on the print medium using printing conditions corresponding to a type of the transfer-target substrate.

2. Related Art

JP-A-2008-102261 discloses a following method. According to the method, a setting dataset of image forming conditions is stored for each printing medium in a server connected to an image forming apparatus via a communication line. The method allows a user to obtain image forming conditions corresponding to a printing medium used in image formation from the server for printing. When a setting dataset corresponding to the printing medium is not obtainable from the server, the method enables registration of image forming conditions set by the user during image formation.

To create a high-quality printed product by sublimation printing, consideration needs to be given not only to printing performed by an image forming apparatus on a transfer sheet but also to the properties of a transfer-target substrate to which transfer is performed from the transfer sheet. However, since a wide variety of transfer-target substrates are used, such a measure is not realistic. Thus, printing conditions are adjusted through a user's manual operation in practice. In particular, the density of a transferred image on the transfer-target substrate is easily influenced by the type of the transfer-target substrate. Thus, the user carries out work for adjusting a duty, which is an amount of ink per unit area, used in printing performed by a printing apparatus on a printing medium, in accordance with a result of checking the density of the transferred image.

However, for example, when the duty is increased, an increase in the amount of ink attached on a printing medium may cause inconveniences such as undulation of the wet printing medium, contact of the undulating printing medium with a print head, and strike-through of the printed image on the back side of the printing medium. Therefore, the user is sometimes unable to increase the duty for achieving a sufficient density. In such a case, it may be difficult to guarantee the quality of the transferred image.

SUMMARY

An advantage of some aspects of the invention is to provide a technique that successfully suppresses the occurrence of inconveniences caused as a result of a printing medium getting wet, regardless of a duty of ink applied to the printing medium through printing.

According to a first aspect of the invention, a printing apparatus includes a print head, a processor, and a drying mechanism. The print head ejects ink onto a printing medium located in a printing region to form an image. The processor is configured to control a duty that is an amount of ink ejected by the print head onto the printing medium per unit area. The drying mechanism includes a transport unit that transports the printing medium in a first direction and a heater that heats the printing medium. The drying mechanism is configured to dry the printing medium having the image formed thereon by the print head, by transporting, using the transport unit, the printing medium to a drying region in which the printing medium is dried by the heater. The processor controls drying of the printing medium performed by the drying mechanism in accordance with the duty.

According to a second aspect of the invention, a printing method includes controlling a duty that is an amount of ink ejected by a print head, which ejects ink onto a printing medium to form an image, onto the printing medium per unit area; and drying the printing medium having the image formed thereon by the print head. In the printing method, drying of the printing medium is controlled in accordance with the duty.

According to the aspects (the printing apparatus and the printing method) of the invention thus configured, drying of a printing medium having an image formed thereon by a print head is controlled in accordance with a duty. Thus, the occurrence of inconveniences caused as a result of a printing medium getting wet is successfully suppressed regardless of the duty of ink applied to the printing medium through printing.

In addition, the printing apparatus may be configured such that the transport unit transports the printing medium to the printing region and to a plurality of predetermined positions in the drying region located on a downstream side of the printing region in the first direction, and the processor causes the transport unit to transport the printing medium having the image printed thereon in the printing region to a downstream-side predetermined position in the first direction among the plurality of predetermined positions as the duty increases. With such a configuration, the degree at which a printing medium is dried is successfully adjusted by selecting a predetermined position serving as a transport destination of the printing medium from among a plurality of predetermined positions to change a drying period.

In addition, the printing apparatus may be configured such that the transport unit transports the printing medium in a second direction opposite to the first direction, and the processor causes the transport unit to transport the printing medium in the first direction from the printing region to the predetermined position in the drying region and then to transport the printing medium in the second direction. With such a configuration, a printing medium having an image printed thereon is dried over a drying period which is a sum of a period from when the printing medium enters the drying region to when the printing medium reaches the predetermined position after being transported in the first direction and a period from when the printing medium is returned in the second direction from the predetermined position to when the printing medium exits from the drying region. In this way, a printing medium having an image printed thereon is successfully dried for sure.

In addition, the printing apparatus may be configured such that the processor has a first mode in which the printing medium having the image formed thereon is permitted to pass through the printing region and a second mode in which the printing medium having the image formed thereon is prohibited from passing through the printing region and switches the first mode to the second mode in response to an increase in the duty. With such a configuration, even when a printing medium gets wet by ink forming an image to slightly undulate, contact of the printing medium with the print head is successfully avoided for sure by carrying out the second mode.

In addition, the printing apparatus may be configured such that the processor controls drying of the printing medium performed by the drying mechanism by adjusting, using the transport unit, a passing speed of the printing medium to decrease as the duty increases while a space between the image formed on the printing medium and an image to be formed consecutively to the image formed on the printing medium is passing through the printing region. Drying of a recording medium performed by the drying mechanism is successfully controlled by adjusting the passing speed in this way.

In addition, the printing apparatus may be configured such that the print head repeatedly performs main scanning a plurality of times, the main scanning being scanning in which the print head ejects ink onto the printing medium while moving in a main-scanning direction, and the processor increases an interval at which the main scanning is repeatedly performed as the duty increases. With this configuration, the occurrence of inconveniences caused as a result of a printing medium getting wet is successfully suppressed regardless of a duty of ink applied to the printing medium through printing.

In addition, the printing apparatus may be configured such that the drying mechanism further includes an air-sending fan that sends air toward the printing medium having the image formed thereon, and the processor causes the air-sending fan to start operating in response to an increase in the duty. With this configuration, the occurrence of inconveniences caused as a result of a printing medium getting wet is successfully suppressed regardless of a duty of ink applied to the printing medium through printing.

In addition, the printing apparatus may be configured such that the processor increases a temperature of the heater as the duty increases. With this configuration, the occurrence of inconveniences caused as a result of a printing medium getting wet is successfully suppressed regardless of a duty of ink applied to the printing medium through printing.

According to a third aspect of the invention, a printing management apparatus includes a communication unit, a storage unit, and a processor. The communication unit communicates with a server storing printing conditions for each type of a printing medium. The storage unit stores the printing conditions downloaded from the server via the communication unit. The processor is configured to set, in a printing apparatus, a printing setting condition that is included in the printing conditions and contributes to drying of the printing medium. The processor sets, in the printing apparatus, the printing setting condition included in the printing conditions in accordance with a duty that is an amount of ink ejected by a print head of the printing apparatus onto the printing medium per unit area.

According to the aspect (the printing management apparatus) of the invention thus configured, a printing setting condition included in printing conditions is set in a printing apparatus in accordance with a duty. Therefore, drying of a printing medium having an image formed thereon by a print head is controlled in accordance with the duty. Thus, the occurrence of inconveniences caused as a result of a printing medium getting wet is successfully suppressed regardless of the duty of ink applied to the printing medium through printing.

In addition, the printing management apparatus may be configured such that the processor controls drying of the printing medium by setting, in the printing apparatus, as the printing setting condition, at least one of a temperature of a heater that dries the printing medium in a drying region, a distance over which the printing medium is transported to the drying region, on/off of an operation of an air-sending fan, permission/prohibition of passage of the printing medium having an image formed thereon through a printing region in which a print head forms an image, and an interval of main scanning performed by the print head in the printing region. With this configuration, the occurrence of inconveniences caused as a result of a printing medium getting wet is successfully suppressed regardless of a duty of ink applied to the printing medium through printing.

In addition, the printing management apparatus may be configured such that the printing conditions include a print data generation condition used by a print data generation apparatus in generation of print data, and the processor sets, in the print data generation apparatus, as the print data generation condition, at least one of a color conversion lookup table used in color conversion processing, a color profile used in color correction, and an SML table for determining a dot size corresponding to a gradation value.

In addition, the printing management apparatus may be configured to further include a storage unit that stores, for each type of the printing medium, the printing setting condition and the print data generation condition in association with each other.

BRIEF DESCRIPTION OF THE DRAWINGS

The invention will be described with reference to the accompanying drawings, wherein like numbers reference like elements.

FIG. 3 is a diagram illustrating an example of a relationship between a duty and a drying power.

FIG. 4 is a diagram illustrating an example of drying parameters that implement the drying power illustrated in FIG. 3.

DESCRIPTION OF EXEMPLARY EMBODIMENTS

Figure 1:
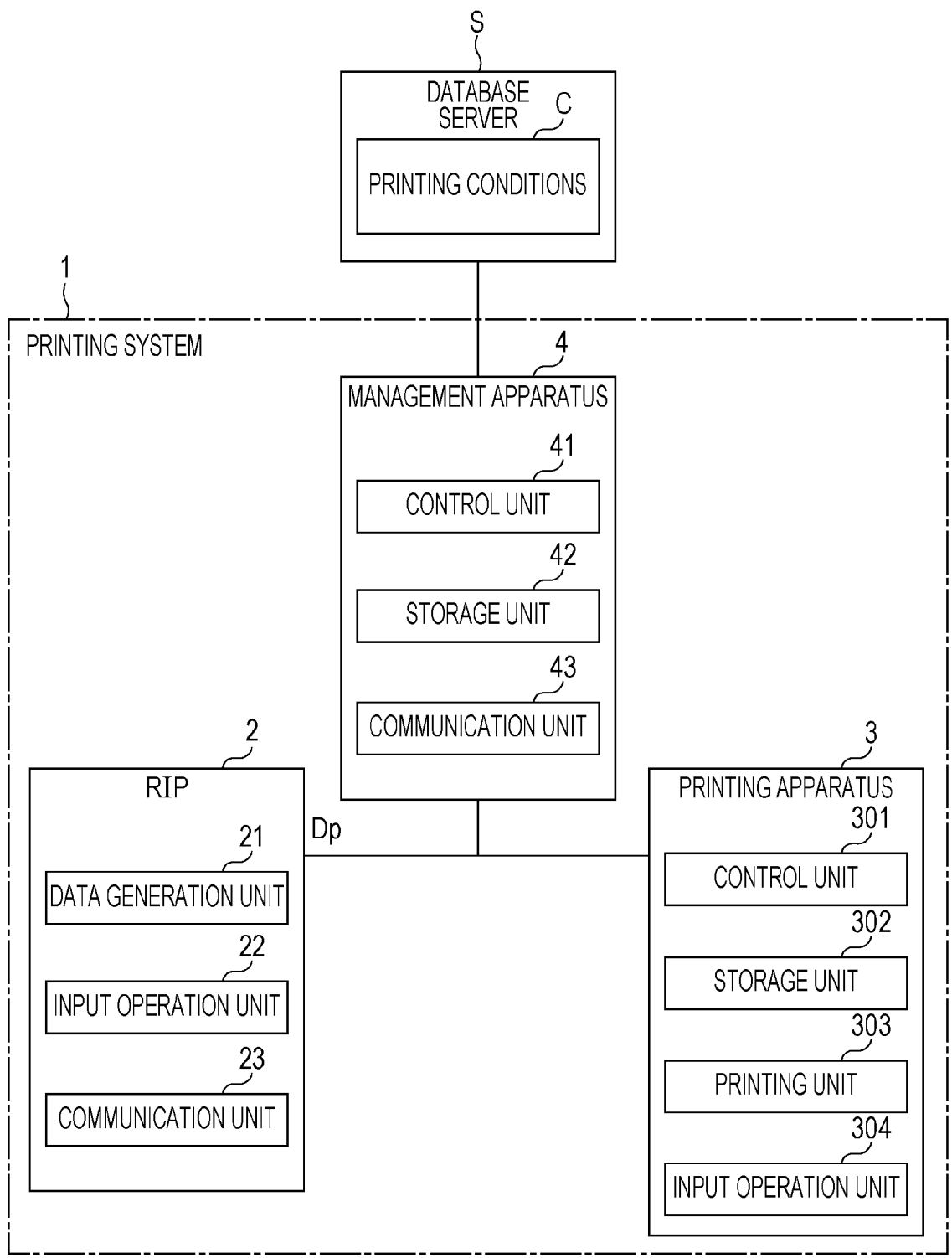
FIG. 1 is a block diagram illustrating an embodiment of the invention in which a printing apparatus is used.

FIG. 1 is a block diagram illustrating an embodiment of the invention in which a printing apparatus is used. This embodiment includes a printing system 1 and a database server S. The printing system 1 includes a raster image processor (RIP) 2 and a printing apparatus 3. The printing system 1 performs a printing process of printing, using the printing apparatus 3, an image represented by print data Dp generated by the RIP 2. More specifically, the printing system 1 prints an image using sublimation ink. This image is caused to sublimate and is transferred onto a transfer-target substrate by a transfer apparatus (not illustrated). The printing system 1 further includes a management apparatus 4 that manages the RIP 2 and the printing apparatus 3.

The management apparatus 4 includes a control unit 41, a storage unit 42, and a communication unit 43. The control unit 41 includes a central processing unit (CPU), a random access memory (RAM), etc. The storage unit 42 includes a hard disk drive or the like. The communication unit 43 communicates with an external device. The control unit 41 is capable of setting a print data generation condition (described later) and a printing setting condition (described later) in the RIP 2 and the printing apparatus 3, respectively. The storage unit 42 stores, for each type of the printing medium, the print data generation condition and the printing setting condition in association with each other. The communication unit 43 communicates with the RIP 2 and the printing apparatus 3 via a local area network. The communication unit 43 also communicates with the database server S via a communication network such as the Internet.

The RIP 2 includes a data generation unit 21, an input operation unit 22, and a communication unit 23. The data generation unit 21 generates print data. The input operation unit 22 accepts a user input operation (regarding, for example, the number of times of overprinting (described later)). The communication unit 23 communicates with the printing apparatus 3 and the management apparatus 4. The data generation unit 21 generates the print data Dp by performing color conversion processing, color correction processing, and dot-size determining processing in this order. In the color conversion processing, image data of red (R), green (G), and blue (B) is converted into image data of cyan (C), magenta (M), yellow (Y), and black (K) using a color conversion lookup table (LUT). In the color correction processing, color matching is performed using an International Color Consortium (ICC) profile. In the dot-size determining processing, a dot size of each pixel is determined based on a gradation value of the pixel represented by gradation data resulting from the color correction processing. Specifically, the dot size is determined with reference to an SML table which indicates a dot size corresponding to a gradation value from among small (S), medium (M), and large (L).

The printing apparatus 3 includes a control unit 301, a storage unit 302, a printing unit 303, and an input operation unit 304. The control unit 301 includes a CPU, a RAM, etc. The storage unit 302 includes a hard disk drive or the like. The printing unit 303 is a mechanical component that prints an image on a printing medium. The input operation unit 304 accepts a user input operation. The printing apparatus 3 prints an image represented by the print data Dp on a printing medium as a result of the control unit 301 causing the printing unit 303 to execute the print data Dp received from the RIP 2.

Figure 2:
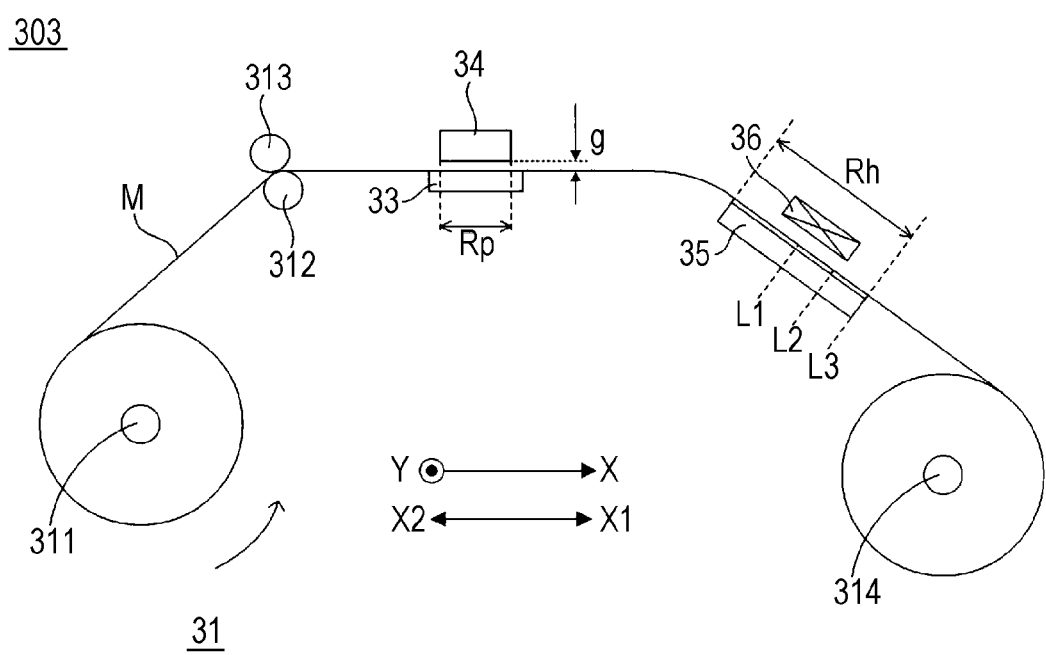
FIG. 2 is a diagram schematically illustrating an example of a printing unit included in the printing apparatus.

FIG. 2 is a diagram schematically illustrating an example of the printing unit 303 included in the printing apparatus 3. Note that the printing unit 303 performs an operation described below under control of the control unit 301. The printing unit 303 includes a transport unit 31 that transports a printing medium M in a transport direction X in a roll-to-roll manner. The transport unit 31 includes a feeding roller 311, a pair of rollers 312 and 313, and a winding roller 314 that are sequentially arranged in the transport direction X of the printing medium M. The feeding roller 311 feeds, in the transport direction X, the printing medium M wound in a roll shape. The pair of rollers 312 and 313 hold the printing medium M fed by the feeding roller 311 therebetween. The roller 313 urges the roller 312 and applies a predetermined load onto the printing medium M. The roller 312 applies a predetermined torque onto the printing medium M to transport the printing medium M in the transport direction X while applying a predetermined tension onto the printing medium M. The winding roller 314 winds up the printing medium M from the pair of rollers 312 and 313. The transport unit 31 is capable of transporting the printing medium M in both directions of the transport direction X, that is, a forward direction X1 and a reverse direction X2 of the transport direction X. The forward direction X1 and the reverse direction X2 are opposite to each other.

The printing unit 303 also includes a platen 33 disposed between the roller 312 and the winding roller 314. The platen 33 is disposed in a printing region Rp and supports the printing medium M located in the printing region Rp. The printing unit 303 further includes a print head 34 that opposes the platen 33 with a predetermined platen gap g therebetween. The print head 34 ejects, using an ink jet method, sublimation ink onto the printing medium M supported by the platen 33 in the printing region Rp.

In the printing unit 303, the transport unit 31 intermittently transports the printing medium M in the forward direction X1 to feed a yet-to-be-printed region of the printing medium M to the printing region Rp. Then, the print head 34 performs main scanning in which the print head 34 ejects sublimation ink while moving in a main-scanning direction Y that is perpendicular to the transport direction X. At that time, a given value is settable as the number of times the print head 34 performs main scanning (the number of paths). The print head 34 performs main scanning as many times as the set number of paths to print an image on the printing medium M that is stationary at the platen 33. At that time, a drying period of the sublimation ink landed on the printing medium M during the previous main scanning is controlled by adjusting the interval at which main scanning is performed multiple times.

The printing unit 303 also includes a heater 35 disposed between the platen 33 and the winding roller 314. The heater 35 is disposed in a drying region Rh located on a downstream side of the printing region Rp in the forward direction X1 and dries the sublimation ink by heating the printing medium M located in the drying region Rh. The printing unit 303 further includes a dryer fan 36 disposed on an opposite side of the heater 35 with the printing medium M interposed therebetween. The dryer fan 36 is disposed in the drying region Rh and dries the printing medium M located in the drying region Rh by sending air toward the printing medium M.

In the printing unit 303, upon completion of printing of an image in the printing region Rp, the transport unit 31 transports the printing medium M having the image printed thereon in the forward direction X1 to feed the printing medium M to the drying region Rh. Once the printing medium M having the image printed thereon is included in the drying region Rh, the transport unit 31 transports the printing medium M in the reverse direction X2 to rewind the printing medium M (feed-dry processing). The printing medium M is dried in the drying region Rh in this way, and then an appropriate position of the printing medium M is set to get ready for printing of the next image.

At that time, the drying region Rh includes feed-target positions L1, L2, and L3 arranged in this order in the forward direction X1. In the feed-dry processing, the printing medium M is transported in the forward direction X1 up to a feed-target position L among these feed-target positions L1, L2, and L3 and is then transported in the reverse direction X2. Thus, the printing medium M having an image printed thereon is dried over a drying period that is a sum of a period from when the printing medium M enters the drying region Rh to when the printing medium M reaches the feed-target position L after being transported in the forward direction X1 and a period from when the printing medium M is returned in the reverse direction X2 from the feed-target position L to when the printing medium M exits from the drying region Rh. The duration of this drying period is adjustable by changing the feed-target position L among the feed-target positions L1, L2, and L3. That is, the drying period increases in the order of the feed-target positions L1, L2, and L3. Note that the printing unit 303 is also capable of starting printing the next image using the print head 34 without causing the transport unit 31 to return the printing medium M for drying.

When an amount of moisture attached on the printing medium M is large, it is expected that the printing medium M is not completely dried in feed-dry processing and consequently the printing medium M slightly undulates. Accordingly, the printing unit 303 is capable of selectively performing a passage prohibited mode in which the printing medium M having an image formed thereon is prohibited from passing through the printing region Rp and a passage permitted mode in which the printing medium M having an image formed thereon is permitted to pass through the printing region Rp. That is, if it is determined that an amount of moisture attached on the printing medium M is relatively large, contact of the printing medium M with the print head 34 is avoided by performing the passage prohibited mode (contact avoidance). On the other hand, if it is determined that an amount of moisture attached on the printing medium M is relatively small, a space between the printed image and an image to be formed next is decreased by performing the passage permitted mode.

The printing apparatus 3 thus configured is capable of performing printing by appropriately optimizing the following machine parameters.

Tension applied to the printing medium M
Load of the roller 313
Platen gap g
Number of times of main scanning (number of paths)
Temperature of the heater 35
Interval at which main scanning is performed
Feed amount in feed-dry processing (feed-target position L1, L2, or L3)
On/off of the dryer fan 36
On/off of contact avoidance Referring back to FIG. 1, the description is continued. In the printing system 1 described above, the RIP 2 generates the print data Dp based on print data generation conditions such as the color conversion LUT, the ICC profile, and the SML table. In addition, the printing apparatus 3 prints an image represented by the print data Dp on the printing medium M based on printing setting conditions such as the machine parameters. Then, the image printed on the printing medium M is caused to sublimate and is transferred onto a transfer-target substrate. The image is transferred onto the transfer-target substrate based on transfer conditions such as the type of the transfer-target substrate, the name of a transfer apparatus that performs the transfer, the transfer pressure, the transfer period, and the transfer temperature. Thus, the printing system 1 downloads printing conditions C including the print data generation conditions, the printing setting conditions, and the transfer conditions from the database server S and uses the printing conditions C as needed.

In sublimation printing, the density of a transferred image on a transfer-target substrate tends to be lower than the density of a printed image on the printing medium M. Thus, the duty used for printing on the printing medium M is changeable in the printing apparatus 3 to adjust the density of the transferred image. The term "duty" refers to an amount of sublimation ink per unit area. A plurality of duties (for example, 50%, 100%, 150%, and 200%) are settable in the printing apparatus 3. When the duty exceeds at least 100%, a desired duty is achieved by performing control so that droplets of sublimation ink are ejected in an overlapping manner for a single pixel (overprinting). Such a duty setting is input as one of the print data generation conditions from the RIP 2 or the management apparatus 4. The printing apparatus 3 ejects sublimation ink onto the printing medium M based on the input duty. The number of times of overprinting is set by the printing apparatus 3 or the management apparatus 4, and overprinting is performed by the printing apparatus 3. In this embodiment, the duty is limited to 50% since ejection of a large amount of ink in a single printing session may cause ink bleed depending on the properties of the printing medium M. For example, when the duty is set to 200%, the desired duty and the required density are achieved by setting the number of times of overprinting to four and by ejecting a droplet of sublimation ink four times for substantially the same pixel while performing the drying control between the printing sessions. The printing apparatus 3 includes a configuration for changing the drying power for drying the printing medium M in accordance with the set duty as described next.

FIG. 3 is a diagram illustrating an example of the duty and the drying power. FIG. 4 is a diagram illustrating an example of drying parameters for achieving the drying power illustrated in FIG. 3. As illustrated in FIG. 3, the printing apparatus 3 sets a higher drying power as the duty increases. Specifically, as illustrated in FIG. 4, the drying power is changeable by adjusting drying parameters (the heater temperature, the main-scanning interval, the feed amount in the feed-dry processing, on/off of the dryer fan 36, and on/off of contact avoidance) that contribute to drying of the printing medium M among the aforementioned machine parameters. Note that the drying parameters illustrated in FIG. 4 can be downloaded from the database server S, are included in the printing conditions C that define appropriate parameter settings in accordance with the properties of the printing medium M, and are stored as preset settings in the storage unit 302 of the printing apparatus 3.

Specifically, the temperature of the heater 35 increases from 50° C. to 55° C. as the duty increases from 100% to 150%. The main-scanning interval increases from 0 seconds to 10 seconds as the duty increases from 50% to 200%. The feed-dry processing is not performed when the duty is 50% but is performed when the duty increases from 50% to 100%. Further, the feed-target position L used in the feed-dry processing is moved to the downstream side in the forward direction X1 as the duty increases. For example, when the duty is 200%, the feed-target position L is set to the feed-target position L3 for which the drying period is the longest, that is, the feed amount of the printing medium M is increased. The dryer fan 36 is in an on-state all the time regardless of the increase or decrease of the duty. The contact avoidance is switched from off to on as the duty increases from 100% to 150%.

Figure 5:
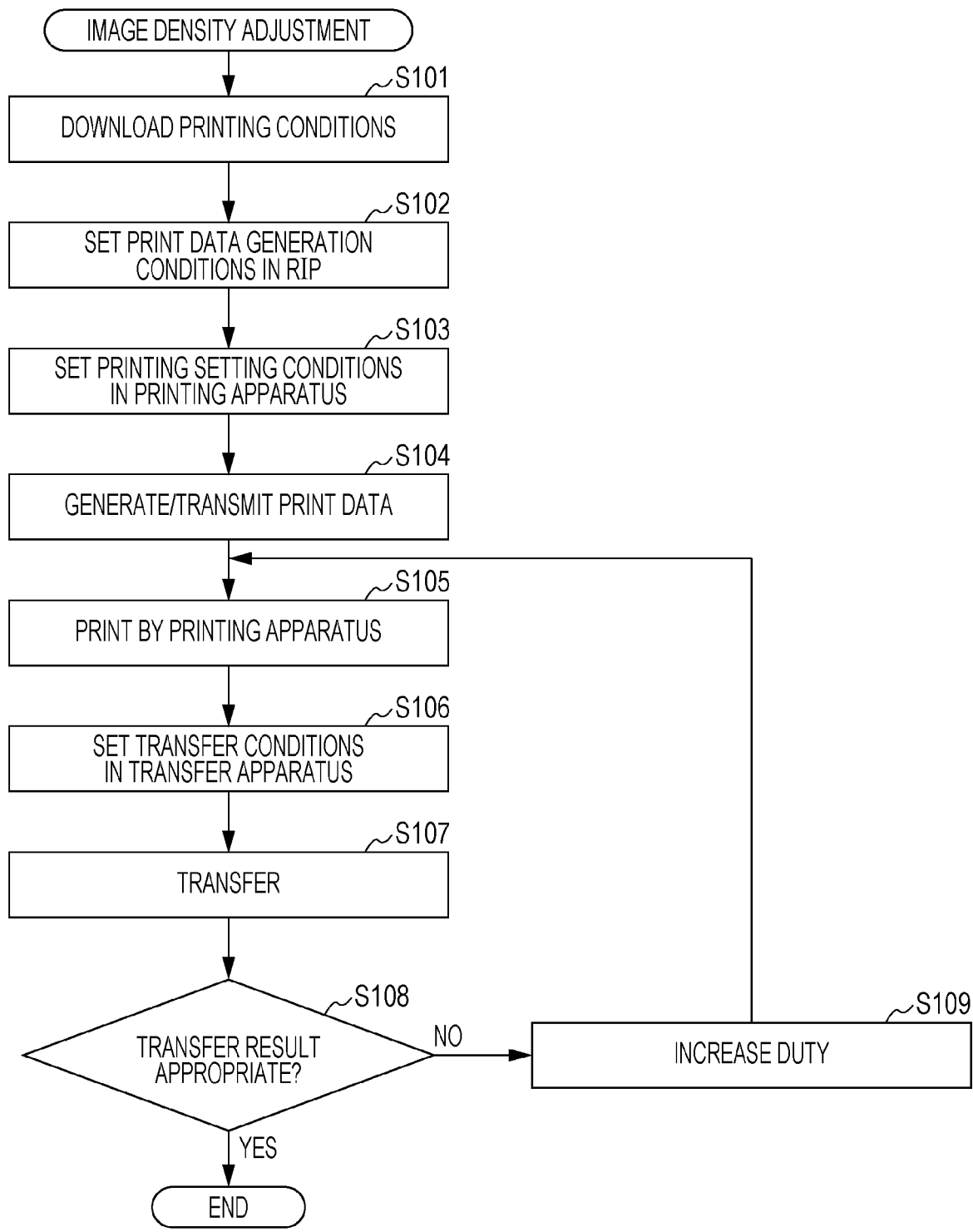
FIG. 5 is a flowchart illustrating an example of image density adjustment that can be performed using the printing apparatus.

FIG. 5 is a flowchart illustrating an example of image density adjustment that can be performed using the printing apparatus 3 illustrated in FIGS. 2 to 4. In step S101, the user operates the management apparatus 4 to download the desired printing conditions C to the management apparatus 4 from the database server S. Then, the management apparatus 4 sets the print data generation conditions included in the downloaded printing conditions C in the RIP 2 (step S102). The management apparatus 4 also sets the printing setting conditions included in the printing conditions C in the printing apparatus 3 (step S103). The RIP 2 may select and set a desired duty from the printing conditions C transmitted from the management apparatus 4 in step S102. In this embodiment, the duty is set to 50%. The data generation unit 21 of the RIP 2 generates the print data Dp using the set print data generation conditions, and the communication unit 43 of the RIP 2 transmits the print data Dp to the printing apparatus 3 (step S104).

Then, the user causes the printing apparatus 3 to start printing (step S105). Consequently, the control unit 301 of the printing apparatus 3 sets the drying parameters corresponding to the duty of 50% in the printing unit 303 and then causes the printing unit 303 to print an image represented by the print data Dp. After the image is printed on the printing medium M, the user positions the printing medium M at the transfer apparatus and sets the transfer conditions included in the printing conditions C in the transfer apparatus (step S106). Then, the transfer apparatus transfers the image on the printing medium M onto a transfer-target substrate based on the transfer conditions (step S107).

In step S108, the user checks the density of the transferred image on the transfer-target substrate. If the density of the image is insufficient (NO in step S108), the user increases the duty set in the printing apparatus 3 (step S109). The process then returns to step S105. In this way, steps S105 to S109 are repeatedly performed until the user determines that the density of the image is appropriate (YES in step S108). Then, the image density adjustment illustrated in FIG. 5 ends.

In the embodiment described above, drying of the printing medium M having an image printed thereon by the print head 34 is controlled in accordance with the duty. Specifically, the drying power achieved by the printing unit 303 is increased as the duty increases. Thus, for example, when the duty is large and an amount of moisture attached on the printing medium M is large, the printing medium M is successfully dried fully with the high drying power. In this way, the occurrence of inconveniences caused as a result of the printing medium M getting wet is successfully suppressed regardless of the duty of sublimation ink applied to the printing medium M through printing.

In addition, the heater 35 that heats the printing medium M is disposed in the drying region Rh. Thus, the printing medium M is successfully dried using the heater 35 for sure by transporting the printing medium M having an image printed thereon to the drying region Rh.

At that time, the control unit 301 increases the temperature of the heater 35 as the duty increases. Thus, for example, when the duty is large and an amount of moisture attached on the printing medium M is large, the printing medium M is successfully dried fully at a high temperature. In this way, the occurrence of inconveniences caused as a result of the printing medium M getting wet is successfully suppressed regardless of the duty of sublimation ink applied to the printing medium M through printing.

In addition, the transport unit 31 is capable of transporting the printing medium M to the printing region Rp and to the drying region Rh located on the downstream side of the printing region Rp in the forward direction X1. The control unit 301 causes the transport unit 31 to transport the printing medium M having an image printed thereon in the printing region Rp to the drying region Rh. In this way, the printing medium M having the image printed thereon is successfully dried in the drying region Rh.

In addition, the transport unit 31 is capable of transporting the printing medium M in the reverse direction X2 which is opposite to the forward direction X1. The control unit 301 causes the transport unit 31 to transport the printing medium M in the forward direction X1 from the printing region Rp to the feed-target position L in the drying region Rh and then to transport the printing medium M in the reverse direction X2 (feed-dry processing). With such a configuration, the printing medium M having an image printed thereon is dried over a drying period that is a sum of a period from when the printing medium M enters the drying region Rh to when the printing medium M reaches the feed-target position L after being transported in the forward direction X1 and a period from when the printing medium M is returned in the reverse direction X2 from the feed-target position L to when the printing medium M exits from the drying region Rh. In this way, the printing medium M having the image printed thereon is successfully dried for sure.

At that time, the control unit 301 is capable of causing the printing medium M to be transported to each of the plurality of feed-target positions L1, L2, and L3 arranged in the forward direction X1. In particular, the printing medium M is transported to the downstream-side feed-target position L in the forward direction X1 among the plurality of feed-target positions L1, L2, and L3 as the duty increases. With such a configuration, the drying degree of the printing medium M is successfully adjusted by selecting the feed-target position L serving as a transport destination of the printing medium M from among the plurality of feed-target positions L1, L2, and L3 to change the drying period.

In addition, the print head 34 is capable of repeatedly performing main scanning a plurality of times. In the main scanning, the print head 34 ejects sublimation ink onto the printing medium M while moving in the main-scanning direction Y. The control unit 301 increases an interval at which the main scanning is repeatedly performed (main-scanning interval) as the duty increases. Thus, for example, when the duty is large and an amount of moisture attached on the printing medium M is large, the main-scanning interval is increased and the printing medium M is successfully dried fully over the increased main-scanning interval. Consequently, the occurrence of inconveniences caused as a result of the printing medium M getting wet is successfully suppressed regardless of the duty of sublimation ink applied to the printing medium M through printing.

In addition, the control unit 301 has the passage permitted mode (first mode) in which the printing medium having an image formed thereon is permitted to pass through the printing region Rp and the passage prohibited mode (second mode) in which the printing medium M having an image formed thereon is prohibited from passing through the printing region Rp. With such a configuration, even when the printing medium M gets wet by sublimation ink forming an image to slightly undulate, contact of the printing medium M with the print head 34 is successfully avoided for sure by carrying out the passage prohibited mode.

In addition, the control unit 301 switches the mode from the passage permitted mode to the passage prohibited mode as the duty increases. With this configuration, even when an amount of sublimation ink attached on the printing medium M increases in response to an increase in the duty and the printing medium M that is wet due to the sublimation ink forming the image slightly undulates, contact of the printing medium M with the print head 34 is successfully avoided.

In addition, the management apparatus 4 stores, in the storage unit 42, the printing conditions C downloaded from the database server S via the communication unit 43 that communicates with the database server S storing the printing conditions C for each type of the printing medium M. The control unit 41 sets the printing setting conditions that are included in the printing conditions C and contribute to drying of the printing medium M in the printing apparatus 3. More specifically, the control unit 41 sets the printing setting conditions included in the printing conditions C in the printing apparatus 3 in accordance with the duty. Therefore, drying of the printing medium M having an image formed thereon by the print head 34 is controlled in accordance with the duty. Thus, the occurrence of inconveniences caused as a result of the printing medium M getting wet is successfully suppressed regardless of the duty of sublimation ink applied to the printing medium M through printing.

In addition, the control unit 41 controls drying of the printing medium M by setting, in the printing apparatus 3, as the printing setting condition, at least one of a temperature of the heater 35 that dries the printing medium M in the drying region Rh, a distance over which the printing medium M is transported to the drying region Rh, on/off of an operation of the dryer fan 36, permission/prohibition of passage of the printing medium M having the image formed thereon through the printing region Rp in which the print head 34 forms the image, and an interval at which the print head 34 performs main scanning in the printing region Rp. Consequently, the occurrence of inconveniences caused as a result of the printing medium M getting wet is successfully suppressed regardless of the duty of sublimation ink applied to the printing medium M through printing.

As described above, in the embodiment described above, the management apparatus 4 corresponds to an example of a "printing management apparatus" according to an aspect of the invention. The control unit 41 corresponds to an example of a "processor" according to the aspect of the invention. The storage unit 42 corresponds to a "storage unit" according to the aspect of the invention. The communication unit 43 corresponds to an example of a "communication unit" according to the aspect of the invention. The printing apparatus 3 corresponds to an example of a "printing apparatus" according to an aspect of the invention. The print head 34 corresponds to an example of a "print head" according to the aspect of the invention. The control unit 301 corresponds to an example of a "processor" according to the aspect of the invention. The transport unit 31, the heater 35, and the dryer fan 36 operate in cooperation with one another to function as an example of a "drying mechanism" according to the aspect of the invention. The forward direction X1 corresponds to an example of a "first direction" according to an aspect of the invention. The reverse direction X2 corresponds to an example of a "second direction" according to the aspect of the invention. The printing region Rp corresponds to an example of a "printing region" according to the aspect of the invention. The drying region Rh corresponds to an example of a "drying region" according to the aspect of the invention. The feed-target positions L1, L2, and L3 correspond to an example of "predetermined positions" according to the aspect of the invention. The main-scanning direction Y corresponds to an example of a "main-scanning direction" according to the aspect of the invention.

Note that the invention is not limited to the embodiment described above, and various modifications can be added to the embodiment described above as long as such modifications do not deviate from the essence of the invention. For example, in the embodiment described above, the dryer fan 36 is controlled uniformly regardless of an increase in the duty. However, the control unit 301 may start the dryer fan 36 (air-sending fan) in response to an increase in the duty, for example, in response to an increase in the duty from 100% to 150%. That is, the control unit 301 may switch the dryer fan 36 on from the off-state. With such a configuration, when the duty increases, the dryer fan 36 starts operating and dries the printing medium M. Also with this configuration, the occurrence of inconveniences caused as a result of the printing medium M getting wet is successfully suppressed regardless of the duty of sublimation ink applied to the printing medium M through printing.

In addition, parameters usable as the drying parameters are not limited to the parameters recited in the example above. For example, the control unit 301 may control drying of the printing medium M by adjusting, using the transport unit 31, a passing speed of the printing medium M while a space (i.e., a margin) between an image formed on the printing medium M and an image to be formed on the printing medium M consecutively to the image is passing through the printing region Rp. Drying of the recording medium M is successfully controlled by adjusting the passing speed of the printing medium M in this way.

At that time, the control unit 301 may decrease the passing speed as the duty increases. With this configuration, for example, when the duty is large and an amount of moisture attached on the printing medium M is large, the printing medium M is successfully dried fully by increasing the time interval at which a plurality of images are formed consecutively. In this way, the occurrence of inconveniences caused as a result of the printing medium M getting wet is successfully suppressed regardless of the duty of sublimation ink applied to the printing medium M through printing.

In addition, all the parameters illustrated in FIG. 4 need not be increased in accordance with an increase in the duty, and only some of the parameters may be increased.

In addition, the number of duties settable in the printing apparatus 3 is not limited to four and may be two or more.

Likewise, the number of drying power levels is not limited to four. For example, another drying power achieved by setting the heater temperature, the main-scanning internal, and the feed amount to the maximum values settable in the printing unit 303 may be set so that the printing medium M is dried at a higher power.

What is claimed is:

1. A printing apparatus comprising:
a print head that ejects ink onto a printing medium located in a printing region to form an image;
a processor that is configured to control a duty that is an amount of ink ejected by the print head onto the printing medium per unit area; and
a drying mechanism including a transport unit that transports the printing medium in a first direction and a heater that heats the printing medium, the drying mechanism being configured to dry the printing medium having the image formed thereon by the print head, by transporting, using the transport unit, the printing medium to a drying region in which the printing medium is dried by the heater, wherein
the processor controls drying of the printing medium performed by the drying mechanism in accordance with the duty,
the transport unit transports the printing medium to the printing region and to a plurality of predetermined positions in the drying region located on a downstream side of the printing region in the first direction, and the processor causes the transport unit to transport the printing medium having the image printed thereon in the printing region to the downstream-side predetermined position in the first direction among the plurality of predetermined positions as the duty increases.

2. The printing apparatus according to claim 1, wherein
the transport unit transports the printing medium in a second direction opposite to the first direction, and
the processor causes the transport unit to transport the printing medium in the first direction from the printing region to the predetermined position in the drying region and then to transport the printing medium in the second direction.

3. The printing apparatus according to claim 2, wherein the processor has a first mode in which the printing medium having the image formed thereon is permitted to pass through the printing region and a second mode in which the printing medium having the image formed thereon is prohibited from passing through the printing region and switches the first mode to the second mode in response to an increase in the duty.

4. The printing apparatus according to claim 1, wherein the processor controls drying of the printing medium performed by the drying mechanism by adjusting, using the transport unit, a passing speed of the printing medium to decrease as the duty increases while a space between the image formed on the printing medium and an image to be formed consecutively to the image formed on the printing medium is passing through the printing region.

5. The printing apparatus according to claim 1, wherein
the print head repeatedly performs main scanning a plurality of times, the main scanning being scanning in which the print head ejects ink onto the printing medium while moving in a main-scanning direction, and
the processor increases an interval at which the main scanning is repeatedly performed as the duty increases.

6. The printing apparatus according to claim 1, wherein
the drying mechanism further includes an air-sending fan that sends air toward the printing medium having the image formed thereon, and
the processor causes the air-sending fan to start operating in response to an increase in the duty.

7. The printing apparatus according to claim 1, wherein the processor increases a temperature of the heater as the duty increases.

* * * * *